United States Patent
Walther et al.

(10) Patent No.: US 9,448,070 B2
(45) Date of Patent: Sep. 20, 2016

(54) GYROMETER WITH REDUCED PARASITIC CAPACITANCES

(75) Inventors: Arnaud Walther, Grenoble (FR); Bernard Diem, Echirolles (FR); Philippe Robert, Grenoble (FR); Jerome Willemin, Tullins (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 647 days.

(21) Appl. No.: 13/459,618

(22) Filed: Apr. 30, 2012

(65) Prior Publication Data

US 2012/0279299 A1 Nov. 8, 2012

(30) Foreign Application Priority Data

May 2, 2011 (FR) ...................................... 11 53732

(51) Int. Cl.
*G01C 19/56* (2012.01)
*G01C 19/5762* (2012.01)
*G01C 19/5712* (2012.01)

(52) U.S. Cl.
CPC ....... *G01C 19/5762* (2013.01); *G01C 19/5712* (2013.01)

(58) Field of Classification Search
CPC ................................................ G01C 19/5762
USPC ..................................................... 73/504.12
See application file for complete search history.

(56) References Cited

U.S. PATENT DOCUMENTS

| 6,862,934 | B2* | 3/2005 | Weinberg ........... G01C 19/5719 73/504.02 |
| 8,695,425 | B2* | 4/2014 | Classen ...................... 73/504.12 |
| 2008/0053226 | A1 | 3/2008 | Diem |
| 2008/0236280 | A1 | 10/2008 | Johnson et al. |
| 2009/0241662 | A1 | 10/2009 | Supino et al. |
| 2010/0132463 | A1 | 6/2010 | Caminada et al. |
| 2011/0219875 | A1 | 9/2011 | Walther et al. |

(Continued)

FOREIGN PATENT DOCUMENTS

| FR | 2 905 457 B1 | 10/2008 |
| JP | 2004-163376 A | 6/2004 |
| JP | 2007-500086 A | 1/2007 |

(Continued)

OTHER PUBLICATIONS

U.S. Appl. No. 13/459,592, filed Apr. 30, 2012, Walther.

(Continued)

*Primary Examiner* — John Chapman, Jr.
(74) *Attorney, Agent, or Firm* — Oblon, McClelland, Maier & Neustadt, L.L.P (57) ABSTRACT

Gyrometer including a substrate and an inertial mass suspended above the substrate, the inertial mass including an excitation part and a detection part, means of moving the excitation part is movable in at least one direction contained in the plane of the inertial mass, and capacitive detection device detecting movement of the detection part outside the plane of the mass. The capacitive detection device includes comprising at least one suspended electrode, located above the detection part located facing the substrate so as to form a variable capacitor with the detection part, the electrode being held above the detection part by at least one pillar passing through the inertial mass.

29 Claims, 10 Drawing Sheets

(56) References Cited

U.S. PATENT DOCUMENTS

2014/0331770 A1   11/2014   Jourdan et al.
2014/0342557 A1   11/2014   Diem

FOREIGN PATENT DOCUMENTS

JP      2010-151808 A        7/2010
WO     WO2010/083918   *    7/2010

OTHER PUBLICATIONS

French Preliminary Search Report issued Feb. 3, 2012 in French Patent Application No. 1153732.
Toshiyuki Tsuchiya, et al., "Vibrating gyroscope consisting of three layers of polysilicon thin films", Sensors and Actuators, vol. 82, No. 1-3, 2000, pp. 114-119.
P. Merz, et al., "Impact of Si DRIE on Vibratory MEMS Gyroscope Performance" Transducers & Eurosensors '07, 2007, pp. 1187-1190.
Toshiyuki Tsuchiya, et al. "Polysilicon vibrating gyroscope vacuum-encapsulated in an on-chip micro chamber", Sensors and Actuators A 90 , 2001, pp. 49-55.
Yishen Xu, et al., "A Monolithic Triaxial Micromachined Silicon Capacitive Gyroscope", Proceedings of the 1st IEEE International Conference on Nano/Micro Engineered and Molecular Systems, Jan. 18-21, 2006, pp. 213-217.
Xuesong Liu, et al. "Design and Fabrication of a lateral axis Gyroscope with Asymmetric Comb-Fingers as Sensing Capacitors", Proceedings of the 1st IEEE International Conference on Nano/Micro Engineered and Molecular Systems, Jan. 18-21, 2006, pp. 762-765.
P. Merz, et al., "Impact of Si DRIE on Vibratory MEMS Gyroscope Performance" Transducers & Eurosensors '07, The $14^{th}$ International Conference on Solid-State Sensors, Actuators and Microsystems, Jun. 10-14, 2007, pp. 1187-1190.
M. Traechtler, et al., "Novel 3-Axis Gyroscope on a Single Chip using SOI- Technology", IEEE Sensors Conference, 2007, pp. 124-127.
W. Geiger, et al., "A new Silicon rate Gyroscope", Sensors and Actuators 73, 1999, pp. 45-51.
S. An, et al., "Dual-axis microgyroscope with closed-loop detection", Sensors and Actuators 73, 1999, pp. 1-6.
T. Fujita, et al. "Disk-shaped bulk micromachined gyroscope with vacuum sealing", Sensors and Actuators 82, 2000, pp. 198-204.
U.S. Appl. No. 14/654,748, filed Jun. 22, 2015, Walther.
U.S. Appl. No. 14/720,282, filed May 22, 2015, Robert, et al.
Notice of Reasons for Rejection issued Jan. 18, 2016 in Japanese Patent Application No. 2012-105207 (with English language translation).

* cited by examiner

GYROMETER WITH REDUCED PARASITIC CAPACITANCES

TECHNICAL FIELD AND PRIOR ART

This invention relates to a MEMS (MicroElectroMechanical System) and NEMS (NanoElectroMechanical System) gyrometer with capacitive detection, with reduced parasitic capacitances.

This invention relates to the field of gyrometers designed to detect Coriolis forces originating from rotations about an axis contained in the plane of the gyrometer.

Gyroscopes comprise an inertial mass moved about an axis called the excitation axis, located in the plane or around an axis located outside the plane; out-of-plane movements induced by Coriolis forces originating from rotations about an axis in the plane are detected.

In the case of a capacitive detection, out-of-plane movements are detected by means of electrodes. The electrodes may be vertical.

However, manufacturing of such electrodes is complex and the cost is high. Furthermore, some structures have variations in the capacitance that are not perfectly linear, but rather vary by complex laws.

According to another technique, the electrodes are horizontal and a variation in the air gap is measured between the electrode and the inertial mass. The variation of the air gap is non-linear, however, the variation law is well known.

The electrode may be located on the substrate below the vibrating mass. Such a gyrometer is described in document P. Merz et al, "*Impact Of Si DRIE On Vibratory MEMS Gyroscope Performance*", TRANSDUCERS & EUROSENSORS '07, p 1187-1190, 2007.

However, these structures have a high parasitic capacitance. In addition to the useful capacitance between the electrode and the active part used to detect out-of-plane movements of the detection part, a parasitic capacitance between the electrode and the substrate arises over the entire surface of the electrode and on the surface of the conductor tracks and the contact pads. Therefore the parasitic capacitance is potentially greater than the nominal capacitance, particularly because the relative permittivity coefficient $\epsilon_r$ of the insulation between the electrode level and the substrate is higher than the air located between the electrode and the active part (typically $\epsilon_r=3.8$ for $SiO_2$). Remember that:

$$C = \frac{\varepsilon_0 \varepsilon_r S}{g}$$

where $\epsilon 0$ the permittivity of vacuum,
S the surface area of the capacitance,
g the air gap distance.

The T. Tsuchiya et al, "*Vibrating gyroscope consisting of three layers of polysilicon thin films*", Sensors and Actuators, vol 82, p 114-119, 2000 document describes a gyrometer comprising a vibrating mass suspended by four beams and arranged between a lower electrode located on the substrate and an upper electrode such that an excitation and differential detection can be made. The upper electrode is formed in a third layer of polysilicon suspended above the inertial mass. This layer is very thin.

This gyrometer also has a high parasitic capacitance between the lower electrode and the substrate. Furthermore, if better sensitivity is required, the thickness of the second layer must be increased, the resonant frequencies of in-plane and out-of-plane movements will then change differently.

PRESENTATION OF THE INVENTION

Consequently, one purpose of this invention is to make a gyrometer with detection of out-of-plane movements with smaller parasitic capacitances and a simplified method of manufacture. In particular, reducing parasitic capacitances reduces noise from capacitive measurements made by the gyrometer.

The purpose mentioned above is achieved with a gyrometer comprising an inertial mass formed of at least one excitation part and at least one detection part, the excitation part being mechanically connected to the detection part and transmitting all or part of the excitation movement to it, means of detecting out-of-plane movement of the detection part formed by an electrode arranged above the detection part facing the substrate, said electrode being held in place above the detection part by means of pillars passing through the inertial mass.

Thus, zones of the gyrometer that could form a parasitic capacitance with the electrode are essentially contact pads, conductor tracks, pillars and possibly the excitation part. Therefore the parasitic capacitance of the gyrometer according to the invention is significantly reduced.

Since the signal to noise ratio is limited by the parasitic capacitance, the reduction of the parasitic capacitance also reduces measurement noise.

Advantageously, due to the use of pillars passing through the detection part and by making an electrode for which the entire surface area is facing the detection part, the parasitic capacitance is further reduced because there is no longer any parasitic capacitance between the electrode and the excitation part.

In general, MEMS or NEMS gyrometers are placed in a cavity inside which a vacuum is created. By using pillars to support the electrode, the layout of the electrode becomes independent of the layout of the cover forming the gyrometer cavity. It is then possible to increase the size of the cavity and therefore the vacuum without changing the position of the detection electrode relative to the detection part.

The subject-matter of the invention is therefore a gyrometer comprising a substrate and an inertial mass suspended above the substrate, the inertial mass comprising at least one excitation part and at least one detection part, means of moving the excitation part in at least one direction contained in the plane of said inertial mass, and capacitive detection means detecting movement of said detection part outside the plane of said mass, said capacitive detection means comprising at least one suspended electrode called the detection electrode, located above the detection part located facing the substrate so as to form a variable capacitor with said detection part, said electrode being held above said detection part by at least one pillar passing through the inertial mass.

In this application, "above the detection part" refers to the fact that the electrode is at least partly above the detection part; therefore the detection electrode can project beyond this part or it can be smaller than this part.

Preferably, the orthogonal projection along the axis orthogonal to the plane of the gyrometer of each point on the electrode is located approximately on the detection part, and the projection of the detection electrode does not project beyond the detection part. Even more preferably, the detection electrode has a surface area approximately equal to the surface area of the detection part, to maximise detection sensitivity.

The gyrometer comprises one or more passages through which the pillar(s) may or may not pass through the detection part and/or the excitation part in zones adjacent to the edges of the detection part.

Preferably, the clearance between the parallel edges of the pillars and the passages in the excitation direction is equal to 0.5 µm to 1 µm more than the excitation amplitude.

For example, the sides of the pillars are between 10 µm and 100 µm and the clearance between the parallel edges of the pillars and the passages is between 1 µm and 10 µm.

In one example embodiment, the inertial mass comprises an excitation part and at least two detection parts, a first detection part being capable of moving along the excitation direction through the excitation part and a second detection part fixed in position in the excitation direction and fixed in movement to the first detection part. Advantageously, the pillar(s) pass through the second detection part. However, this example is not limitative, the pillars could also pass through the first detection part.

The inertial mass may comprise at least two detection parts, the detection electrode being located above one of the detection parts.

In one example embodiment, the inertial mass comprises at least two detection parts that will resonate in phase, the detection electrode being located above the two detection parts.

In another example embodiment, the inertial mass comprises at least two detection parts that will resonate in anti-phase, said gyrometer comprising two detection electrodes each located above a detection part, the two detection electrodes separately detecting displacements of the detection parts facing them.

The gyrometer may comprise two mechanically coupled inertial masses, at least for one excitation mode and two detection electrodes each arranged above a detection part of each inertial mass, the two detection electrodes separately detecting displacements of detection parts facing them.

In one variant embodiment, the inertial mass may comprise a disk-shaped excitation part, said excitation part being free to move about the axis of said disk, and several detection parts arranged to be free to move inside the excitation part.

The gyrometer may comprise a cover that delimits a hermetically sealed cavity around the at least one inertial mass and the at least one detection electrode, a vacuum being set up in said cavity.

Another purpose of this invention is a measurement system comprising a gyrometer according to this invention and a gyrometer to detect rotations about an axis outside the plane.

The measurement system may comprise detection electrodes perpendicular to the plane of the gyrometer to detect displacement in the plane of said at least one detection part.

Advantageously, the conductor tracks that connect the electrodes to the pads are suspended and are made at the same time as the detection electrode.

Another subject-matter of the invention is a measurement system comprising at least one gyrometer according to this invention and at least one accelerometer. For example, the accelerometer may be a capacitive accelerometer that will detect out-of-plane accelerations and comprising at least one electrode for detecting an out-of-plane acceleration contained in the plane and/or a capacitive accelerometer that will detect in-plane accelerations and comprising at least one electrode perpendicular to the plane.

The at least one electrode contained in the plane is advantageously made at the same time as the detection electrode of said gyrometer.

Another subject-matter of the invention is a method for making a gyrometer according to this invention, comprising the following steps starting from an element including an oxide layer deposited on a substrate and covered with an active layer:

deposition of a first protective layer, protecting the active layer against oxidation, etching of the protective layer to release the active layer in at least a first zone, thermal oxidation and growth of the oxide at the first zone in the released active layer, so as to form an oxide overthickness at said first zone, deposition of a second protective layer on the oxide overthickness, etching of the active layer to form trenches that reach the oxide layer, deposition of a closing off layer covering the active layer and closing off the trenches, etching of said closing off layer to release at least one second zone of the active layer, formation of the detection electrode such that the electrode is supported on said second zone, release of the inertial mass and the electrode.

For example, the first and/or second protective layer(s) is (are) made of $Si_3N_4$.

The closing off layer covering the active layer and closing the trenches may for example be made of PSG.

The method may comprise a step to make at least one contact pad after the detection electrode has been made and at least one non-suspended electrical conductor track connected to the detection electrode, the contact pad being made on the conductor track.

The electrical conductor track is preferably made at the same time as the detection electrode.

For example, the element may be an SOI substrate and the detection electrode may be made of polysilicon.

For example, the release step may be obtained by wet etching of the PSG and etching of the oxide layer.

BRIEF DESCRIPTION OF THE DRAWINGS

This invention will be better understood after reading the following description and the appended drawings in which.

DETAILED PRESENTATION OF PARTICULAR EMBODIMENTS

Figure 1A:
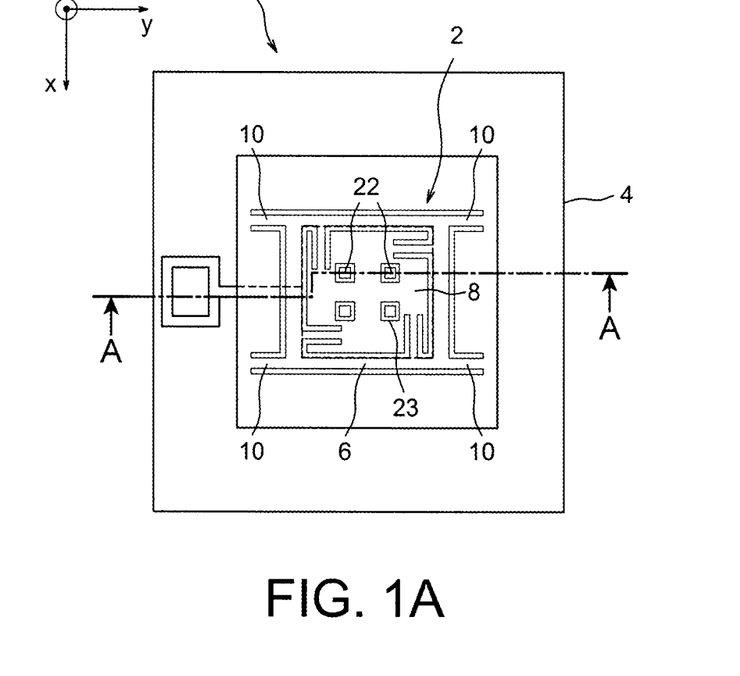
FIG. 1A shows a top view of an example embodiment of a gyrometer according to this invention.

FIG. 1A shows a gyrometer G1 according to one example embodiment of this invention comprising an inertial mass 2 suspended above a substrate 4.

Figure 3A:
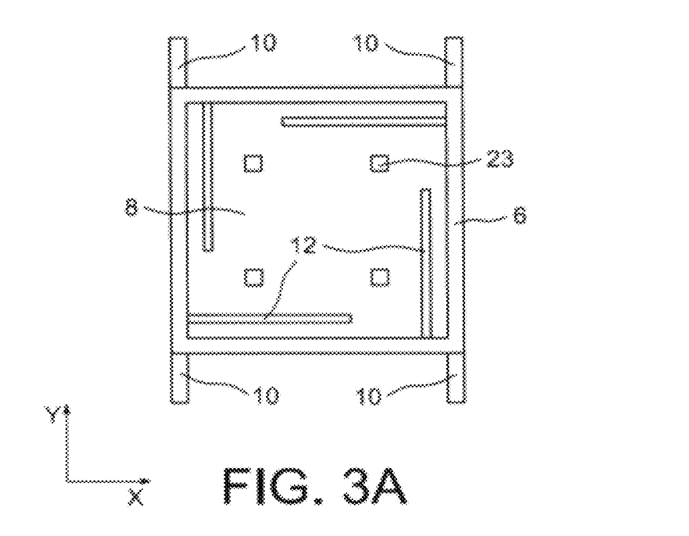
FIG. 3A shows a top view of the inertial mass in FIG. 1A.

The inertial mass 2 shown alone in FIG. 3A comprises a first part 6 called the excitation part, and a second part 8 called the detection part.

The excitation part 6 will be moved along an X axis contained in the plane of the gyrometer. The detection part 8 will be moved along a Z axis by Coriolis forces, the Z axis being perpendicular to the X axis and to the plane of the paper in the view in FIG. 1A. The movement of the excitation part 6 is called "in-plane movement" and the movement of the detection part 8 is called the "out-of-plane movement".

A gyrometer designed to detect rotations about the X axis is called an "X gyrometer".

The Z gyrometer is designed to detect rotations about the Z axis.

The Y axis is perpendicular to the X and Z axes and is contained in the plane of the gyrometer.

An XY gyrometer is designed to detect rotations about the X and Y axes.

Figure 3B:
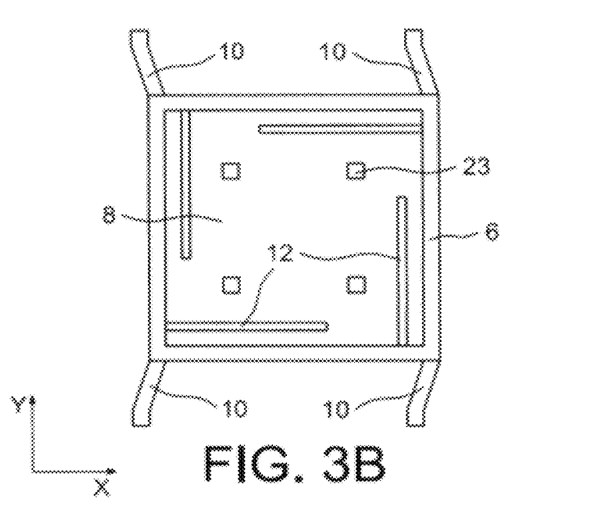
FIG. 3B shows a top view of the inertial mass in FIG. 1A in excitation mode.

The excitation part 6 in the example shown forms a frame suspended from the substrate 4 by four straight beams 10, aligned in pairs and parallel to each other. FIG. 3B shows the inertial mass in excitation mode, the beams 10 bending in the plane and the inertial mass moving along the X axis.

The detection part 8, rectangular in shape, is arranged inside the frame of the excitation part 6 and is suspended from it by four beams 12, each perpendicular to one side of the mobile part. Two beams located on two consecutive sides are perpendicular to each other.

Figure 3C:
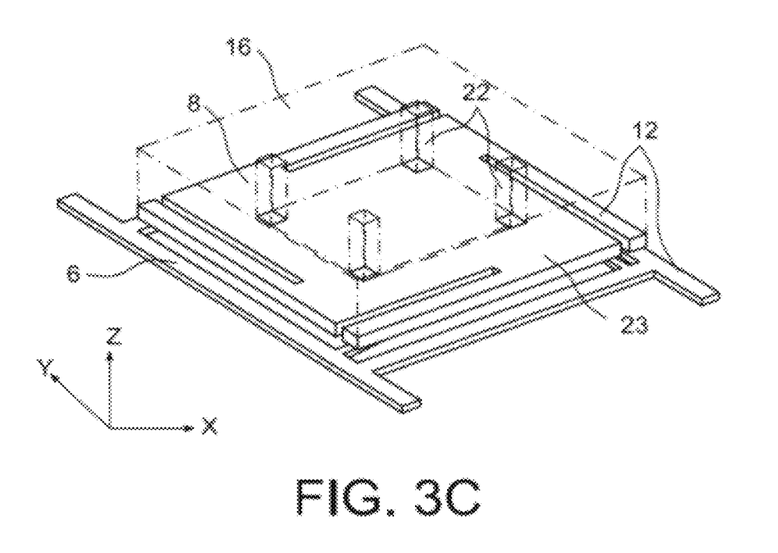
FIG. 3C shows a top view of the inertial mass in FIG. 1A in detection mode.

FIG. 3C shows the inertial mass in a detection mode; the detection part 8 is then in a position offset from the excitation part along the Z axis, the beams 12 being in an out-of-plane bending mode.

Excitation means of the excitation part 6 along the X axis are provided (not shown). These excitation means may be of the electrostatic type, using inter-digitised, piezoelectric, magnetic combs, etc.

The gyrometer also comprises capacitive means 14 of detecting the displacement of the detection part 8. The capacitive detection means 14 comprise an electrode 16 located above the inertial mass 2 facing the substrate 4.

Figure 1B:
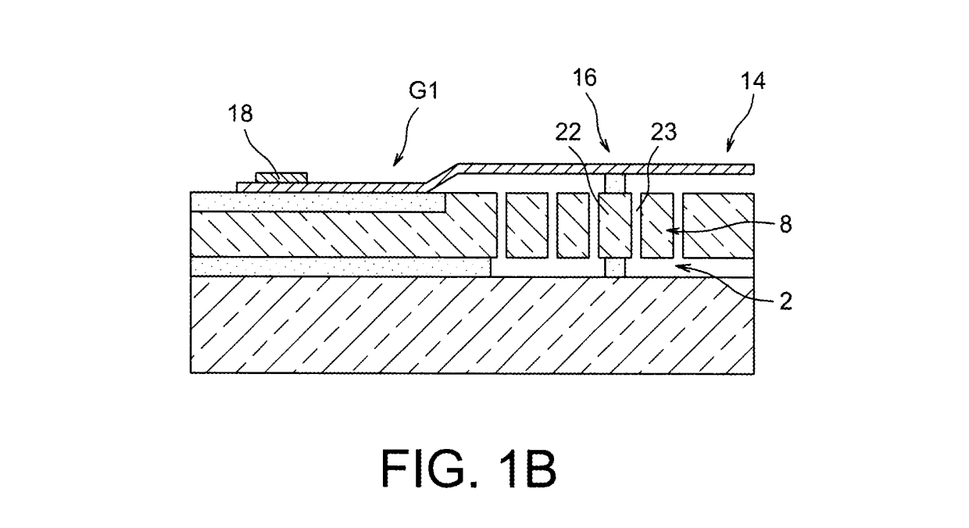
FIG. 1B is a part of a sectional view of FIG. 1A along plane AA.

The electrode 16 is visible particularly well in FIG. 1B; it is shown in dashed lines in FIG. 1A. The electrode 16 is electrically connected to a detection circuit (not shown) by means of a contact pad 18.

Particularly advantageously, the surface area of the electrode 16 is not larger than the surface area of the detection part 8 and faces only the detection part. The orthogonal projection of any part of the electrode 16 along the Z axis is located in the detection part 8. In the example shown, the surface areas of the electrode 16 and the detection part 8 are approximately the same.

Preferably, the electrode 16 has the same surface area as the detection part 8, and the useful capacitance is thus as large as possible and its sensitivity is maximised.

The electrode 16 is held in place above the inertial mass by means of pillars 22 passing through said inertial mass 2, such that the position of the electrode 16 relative to the substrate is constant.

In the example shown, there are four pillars 22 arranged in a rectangle similar to the detection part 8. This number and this arrangement are in no way limitative, and are chosen particularly as a function of the shape and the surface area of the detection part and are adjusted so as to provide sufficient stiffness to the suspended electrode, particularly such that the resonant frequency of the electrode is very much higher than the frequency of movement of the inertial mass.

The pillars 22 pass through the detection part through passages 23 formed in the detection part, said pillars 22 being anchored on the substrate.

Advantageously, the pillars 22 and the passages 23 are made simultaneously by etching.

The dimensions of the passages and the pillars are such that there is no contact between the pillars and the excitation part in excitation mode in which the excitation part has a displacement along X.

The clearance between the parallel edges of the pillars and the passages along the excitation direction is preferably chosen to be between 0.5 µm and 1 µm larger than the excitation amplitude.

For example, the sides of the pillars are between 10 µm and 100 µm and the clearance between the parallel edges of the pillars and the passages is between 1 µm and 10 µm.

As we will see below in the description of an example manufacturing method, the clearance between the edges of the pillars and the passages is limited by the manufacturing technology and particularly by the maximum dimensions that can be filled during the closing off step.

As shown in FIG. 1A, the surface area of the electrode 16 is particularly advantageously approximately the same as the surface area of the detection part and is facing it. Consequently, none of its surface area is facing the excitation part, which reduces capacitances between the electrode 16 and the excitation part 6, which is not useful for detecting out-of-plane movement of the detection part.

The electrode 16 and the detection part 8 form a variable capacitor, the capacitance in this case varies as a function of the displacement of the detection part along the Z axis. This variation in capacitance controls the displacement amplitude of the detection part and thus determines the Coriolis forces applied to the gyrometer and therefore to the system in which the gyrometer is installed.

The structure of the gyrometer shown in FIG. 1A reduces parasitic capacitances. Due to the suspended position of the electrode above the inertial mass, there are no parasitic capacitances between the electrode and the substrate, or they are very weak because they are limited to the anchor surface areas of the pillars on the substrate. The parasitic capacitance between the electrode and the excitation part is also weak or even zero. All that remain are parasitic capacitances between the contact pads and the substrate and between the electrical conductor tracks and the substrate.

We will now describe operation of the gyrometer in FIG. 1A in detection.

The inertial mass 2 is put into excitation through the excitation part 6 that is moved by the excitation means. The inertial mass moves as shown in FIG. 3B. If Coriolis forces appear, the detection part 8 moves out of the plane along the Z axis, the modification of the distance between the detection part 8 and the electrode 16 modifies the capacitance of the capacitor thus formed, this variation in capacitance being detected and analysed in order to determine the value of the Coriolis forces.

Figure 4:
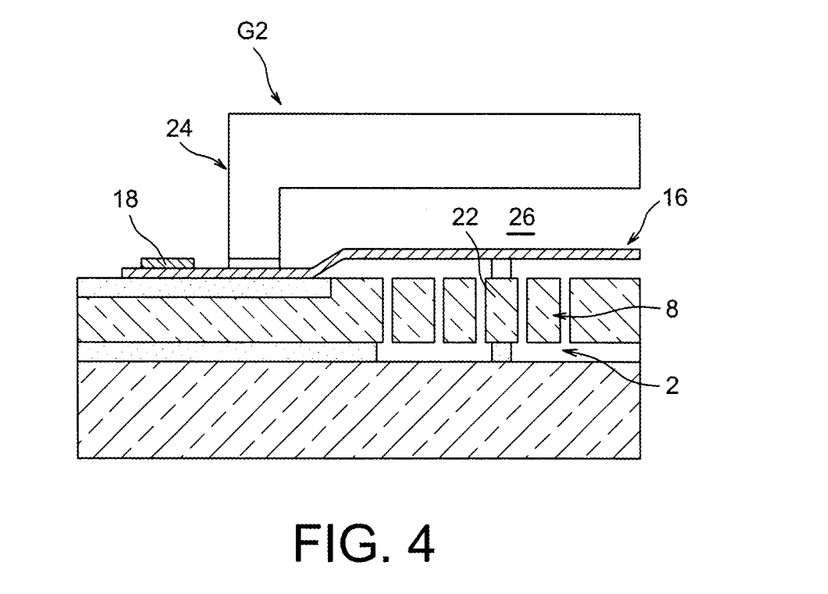
FIG. 4 shows a sectional view of a gyrometer according to this invention with a sealing cavity.

FIG. 4 shows another example embodiment of a gyrometer G2 according to this invention. This gyrometer comprises a cover 24 covering the inertial mass, the cover 24 delimiting a sealed cavity 26 with the substrate.

The cover 24 is sealed on the substrate. Advantageously, a gap is generated to improve operation of the gyrometer. With this invention, the position of the electrode relative to the detection part is independent of the volume of the cavity 26 formed by the cover 24 and the substrate 4, because the electrode 16 is not supported by the cover 24. Cavities 26 with a very large volume can then be made so that a very high vacuum value can be created. Required vacuum values are typically between $10^{-1\ mbars}$ and $10^{-3}$ mbars.*

Figure 2:
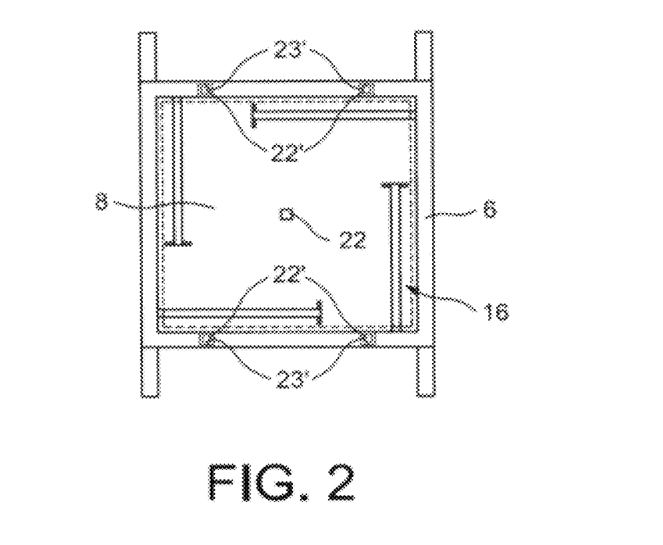
FIG. 2 shows a partial top view of another example embodiment of a gyrometer according to this invention.

Another example of a gyrometer according to this invention can be seen in FIG. 2, in which the pillars are as close as possible to the detection part. The gyrometer comprises four pillars 22' passing through the excitation part 6 in zones adjacent to the detection part 8 and a pillar 22 passing through the detection part 8 at its centre. The detection electrode is shown in dashed lines and its surface area is approximately the same as the surface area of the detection part 8. For example, the passages 23' in the excitation part form notches in the inner edge of the excitation part 6, open towards the detection part 8.

As a variant, no pillar passes through the detection part, the electrode being suspended solely by the pillars 22' passing through the excitation part.

Figure 5A:
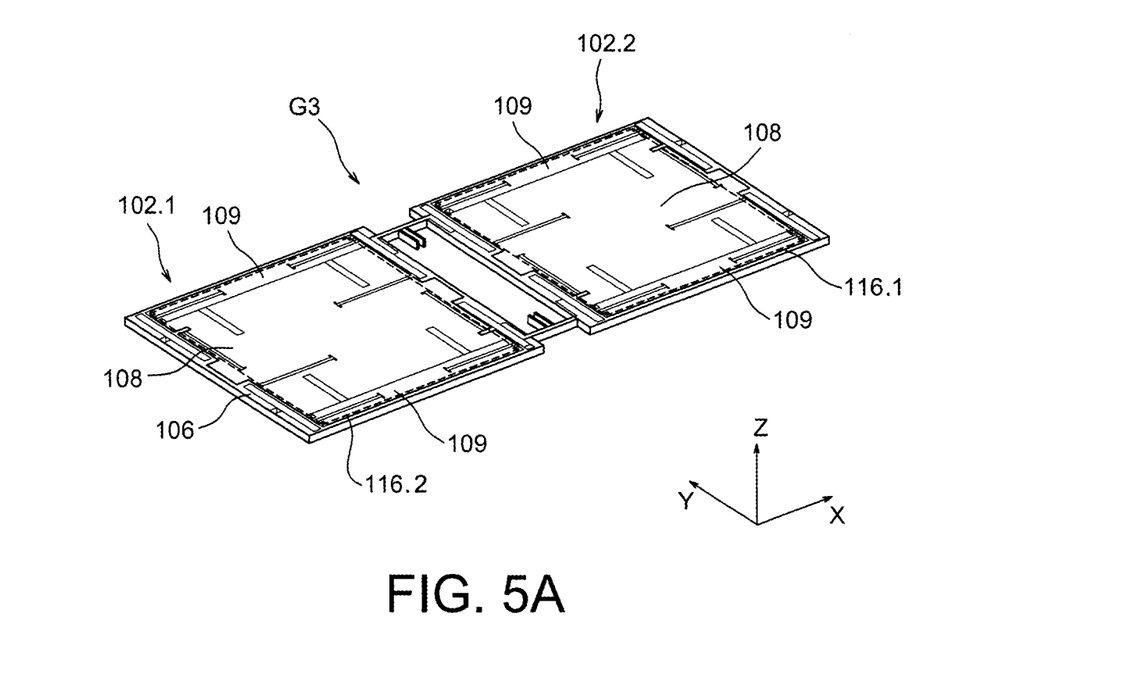
FIG. 5A shows a perspective view of another example of a gyrometer according to this invention.
Figure 5B:
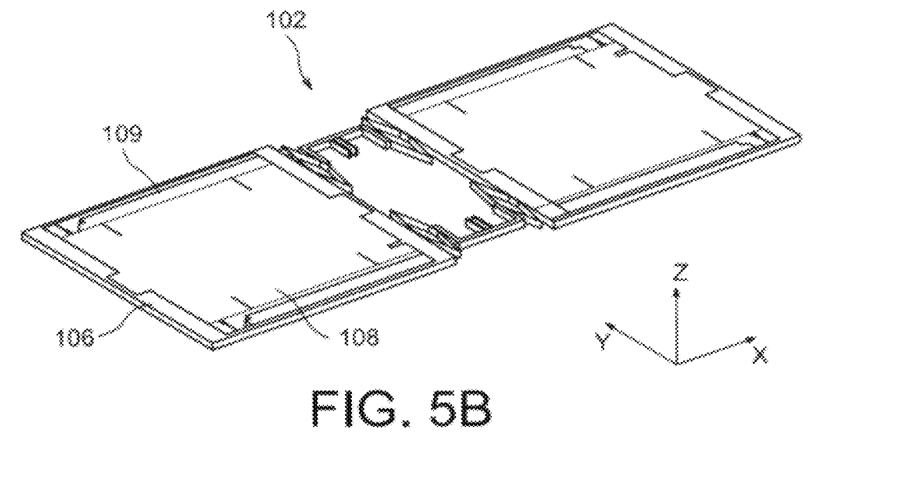
FIG. 5B shows a diagrammatic perspective view of the gyrometer in FIG. 5A in excitation mode.

FIG. 5A shows another example embodiment of a gyrometer G3 according to this invention. The inertial mass 102 comprises two masses 102.1, 102.2, each composed of three parts:

an excitation part 106 that only moves along the excitation axis X, a first detection part 108 that moves in excitation fixed to the excitation part 106 and that moves along the detection direction Z when a Coriolis force is applied to it, and a second part 109 anchored along the excitation direction and that moves along the detection direction fixed to the detection part 108.

Figure 5C:
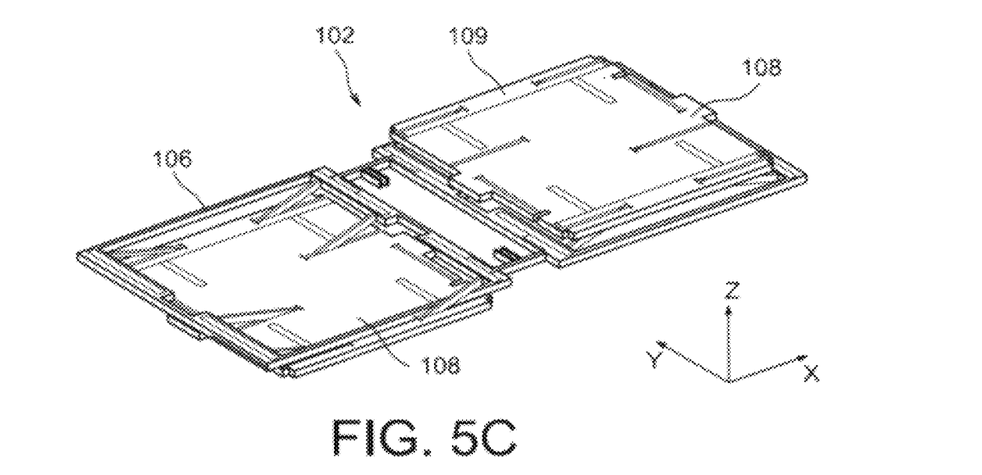
FIG. 5C shows a diagrammatic perspective view of the gyrometer in FIG. 5A in detection mode.

Two electrodes 116.1, 116.2 shown in dashed lines are arranged above each of the detection parts 109, to separately detect movements of each of the second detection parts that move in anti-phase as can be seen in FIG. 5C.

Preferably, the pillars (not shown) supporting the suspended electrodes pass through the second detection part that can only move along the Z axis. Thus, the pillars are not likely to come into contact with the structure in excitation mode along the X axis.

In this example embodiment, the two excitation parts 106 are connected through connecting means such that they vibrate in phase opposition. The detection movements of the detection parts 108 induced by the Corialis force are then also in phase opposition. The two suspended electrodes detect movements in phase opposition of each of the detection parts 108.

In another example embodiment of the gyrometer, the inertial mass comprises one excitation part and two detection parts. One of the detection parts is connected to the excitation part such that all or some of the excitation movement is transmitted to it. The two detection parts are connected such that the movement of one of the masses along the detection direction only transmits part of the movement to the other mass.

There are then two resonance modes in detection; one in which the two parts resonate in phase, and the other in which the two parts resonate in phase opposition.

The detection means may then comprise either one or several electrodes suspended above only one of the two detection parts, and either of the resonance modes in detection is then used. In another example, the detection means comprise one or several electrodes suspended above the two detection parts, the electrodes being connected to each other and operate as a single electrode. In this example, in phase resonance mode only is used.

In another example, the detection means comprise two electrodes or two groups of at least two electrodes connected to each other; each electrode or group of electrodes is suspended above a detection part. The two electrodes or the two groups are independent of each other. In this case, the phase opposition resonance mode is used. The pillars are made in the detection part facing which the electrode dedicated to it is located.

Advantageously, several electrodes connected to each other are used instead of a single electrode, which minimises parasitic capacitances due to the pads and conductor tracks.

Figure 7:
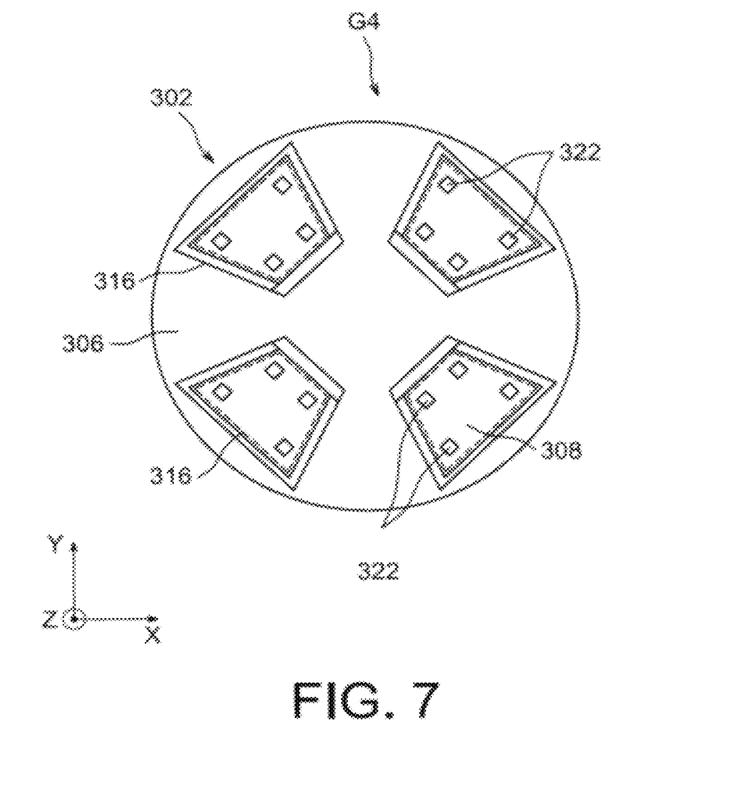
FIG. 7 shows a perspective view of another example gyrometer according to this invention.

According to another example embodiment of a gyroscope G4 shown in FIG. 7, the inertial mass 302 comprises an excitation part 306 and several detection parts 308. For example, the excitation part 306 is in the shape of a disk that will be moved about a Z axis perpendicular to the plane of the disk. The disk comprises cut-outs distributed about a Z axis in which the detection parts are installed, the detection parts then being free to move about an axis located in the plane of the disk. This gyrometer comprises four detection electrodes 316 (shown in dashed lines) supported by pillars 322 above each of the detection parts. The pillars 322 pass through the detection parts 308; there are four of them to support each electrode 316.

For example, the inertial mass comprises three pairs of detection masses, each pair being associated with different detection axes.

As a variant, the inertial mass comprises several excitation parts connected to each other through a mechanical coupling structure such that all excitation parts have an identical resonant frequency in excitation.

According to yet another example embodiment, the inertial mass is formed from at least two coupled masses in an excitation mode.

Each mass comprises an excitation part and a detection part. The masses are actuated in phase opposition in excitation.

This gyrometer has the advantage that is it relatively insensitive to accelerations.

As a variant, the excitation mass can also have an out-of-plane degree of freedom.

Advantageously, the detection electrode(s) may be used as actuation electrodes in order to displace the detection part(s) of the inertial mass vertically. For example, this use of the detection part(s) for vertical actuation purposes can be used to apply a detection counter reaction.

The gyrometer according to the invention may be associated with other electrodes for example with actuation functions, to provide a counter-reaction or trimming, the trimming actually consisting of inserting an electrostatic stiffness to adjust the resonant frequency in detection.

In another example embodiment, the gyroscope according to this invention may be associated with a Z gyroscope that detects rotations about the axis outside the plane.

The gyroscope Z may be a capacitive gyroscope involving vertical detection electrodes. These electrodes are connected to a contact pad and possibly connected to each other by a suspended conductor track. Advantageously, the conductor tracks are made at the same time as the suspended horizontal electrode(s) according to this invention.

The example embodiments described are applicable to a Y gyrometer, however X gyrometers with electrodes supported by pillars above the detection part(s) are not outside the scope of this invention. The excitation means are adapted so as to move the excitation parts along the Y axis.

It would also be possible to associate the gyroscope according to the invention with one or two detection axes in the plane, with one or several capacitive accelerometers. A Z gyrometer could also be associated with it.

The capacitive accelerometer may comprise a suspended electrode for detection of accelerations along the Z axis and/or one or more vertical electrodes for detection of accelerations in the plane, the suspended and/or vertical electrode(s) possibly being connected to contact pads through a suspended conductor track. Advantageously, the suspended electrodes and/or the suspended conductor tracks are made at the same time as the suspended electrode of the gyroscope.

We will now describe an example of a particularly advantageous method of making the gyroscope according to this invention, for example to manufacture the gyroscope in FIG. 1A.

FIGS. 6A to 6H diagrammatically show the different steps in this manufacturing method.

Figure 6A:
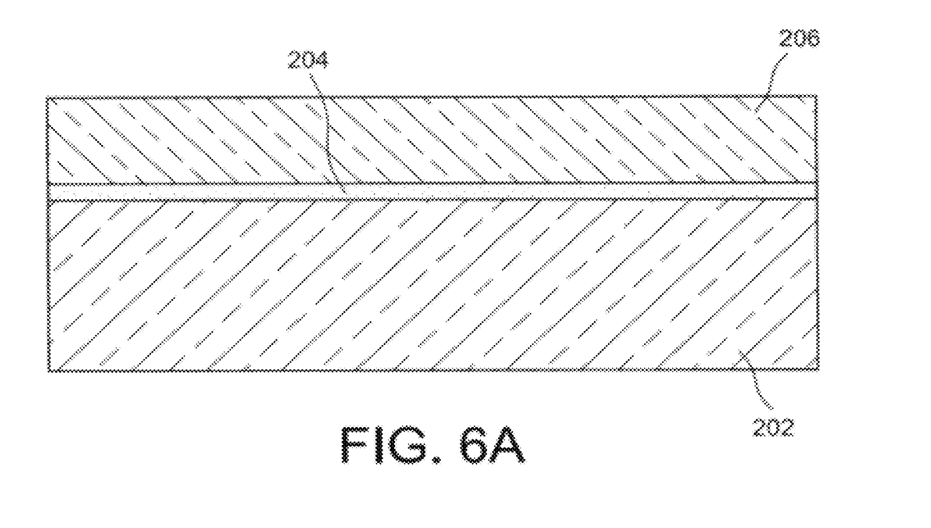
FIGS. 6A to 6H are diagrammatic representations of different steps of an example of a method for making a gyrometer according to this invention.

In a first step, the substrate on and in which the gyrometer will be made, will be produced. For example, it may be an SOI ("Silicon on Insulator") substrate. It comprises a silicon based layer 202, a buried silicon oxide layer 204 with a thickness for example of between 0.5 µm and 5 µm. It also comprises a silicon layer 206 deposited on the buried oxide layer 204, for example with a thickness of between 1 µm and 100 µm. This substrate is shown in FIG. 6A.

During the next step, an $Si_3N_4$ nitride layer 208 is deposited over the entire surface of the silicon layer 202. A resin layer is then deposited on the nitride layer and lithography is done on the nitride layer in order to delimit nitride zones to be etched.

The nitride layer is then etched, releasing end zones from the silicon layer 206. This released zone forms a frame around the contour of the surface of the substrate. The resin is then stripped.

The next step is thermal oxidation for the formation of a thermal oxide overthickness 210 at the end zones released from the silicon layer 206. FIG. 1A shows this overthickness 210 forming a frame around the inertial mass.

Figure 6B:
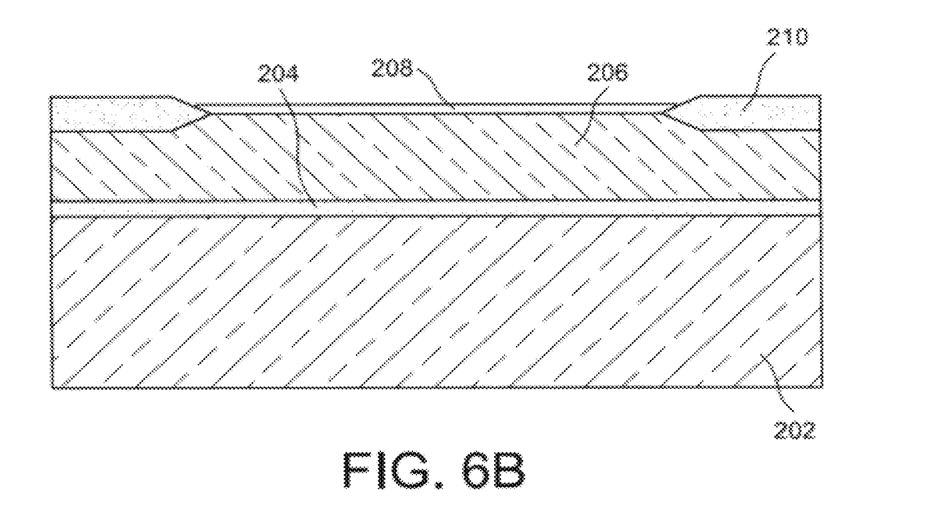
Figure 6C:
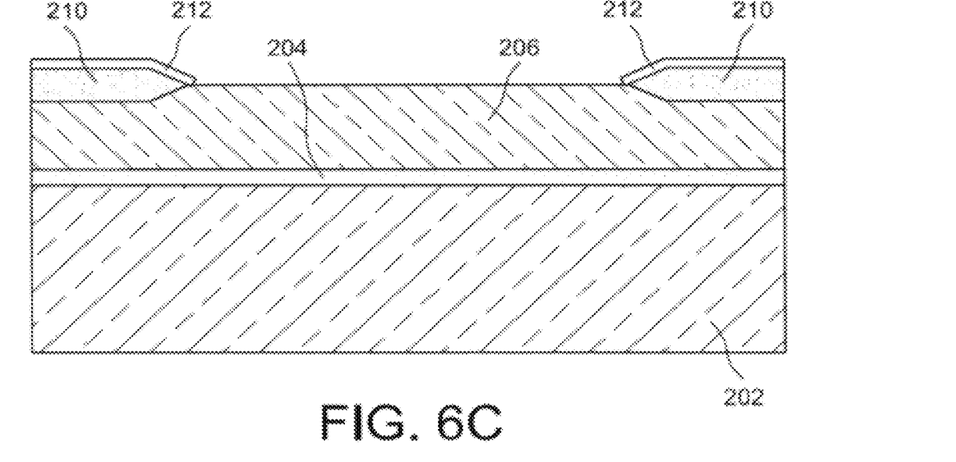

The element shown in FIG. 6B is then obtained.

The surface is then stripped to eliminate the oxinitride that formed on the remaining nitride zone 208 during thermal oxidation. The purpose of this stripping is to slightly reduce the thermal oxide 210.

The next step is to make a deposit of a nitride layer 212 covering the overthickness of the thermal oxide 210 made in the previous step and the nitride zone 208. A resin layer is deposited on the nitride layer and a lithography of the nitride layer is done to release the portion of nitride 208 located between the two portions of thermal oxide 210. This released portion is then etched to eliminate it. The resin is then stripped. The element obtained can be seen in FIG. 6C.

In the next step, the delimitation is made using a resin and lithography of the zones that will be deeply etched. Deep etching of the silicon layer 206 is then done for example by deep reactive-ion etching (DRIE), to form trenches 214. The etching reaches the oxide layer 204. The element obtained can be seen in FIG. 6D.

Figure 6D:
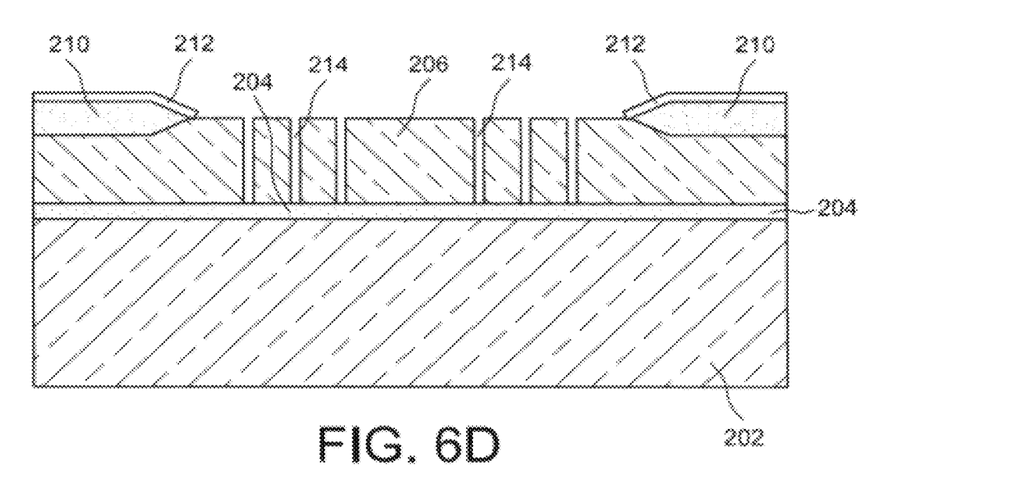
Figure 6E:
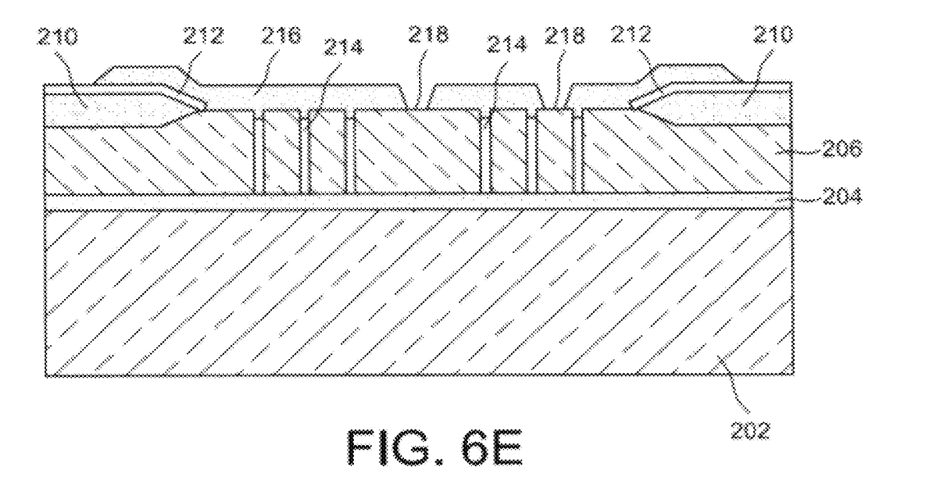

In a next step, a Phosphorus Silicate Glass PSG layer 216 is deposited on the surface of the element in FIG. 6D, for example with a thickness of 4 µm. Creep annealing is then applied to make the PSG creep and the PSG penetrates into the trenches 214 and closes them. There is no need for the trenches to be completely filled. Other oxides can be used to fill the trenches as variants. Silica ($SiO2$) can be used with a deposition method that assures that silica is deposited on the edges of the etching trenches and closes the trenches.

A resin layer is deposited on the PSG on the surface, which is lithographed in order to delimit PSG etching zones. The PSG is then etched to release zones 218 on the surface of the silicon layer 206.

Finally, the surface is stripped. The element obtained can be seen in FIG. 6E.

In a next step, a conducting layer 220 is deposited that will form the suspended electrode and the electrical conductor tracks.

This is done by depositing polysilicon on the PSG layer 216.

A resin is deposited on this polysilicon layer 220; a lithography of the resin is then done. Finally, the polysilicon layer 220 is etched. The surface is stripped to remove the resin mask.

Figure 6F:
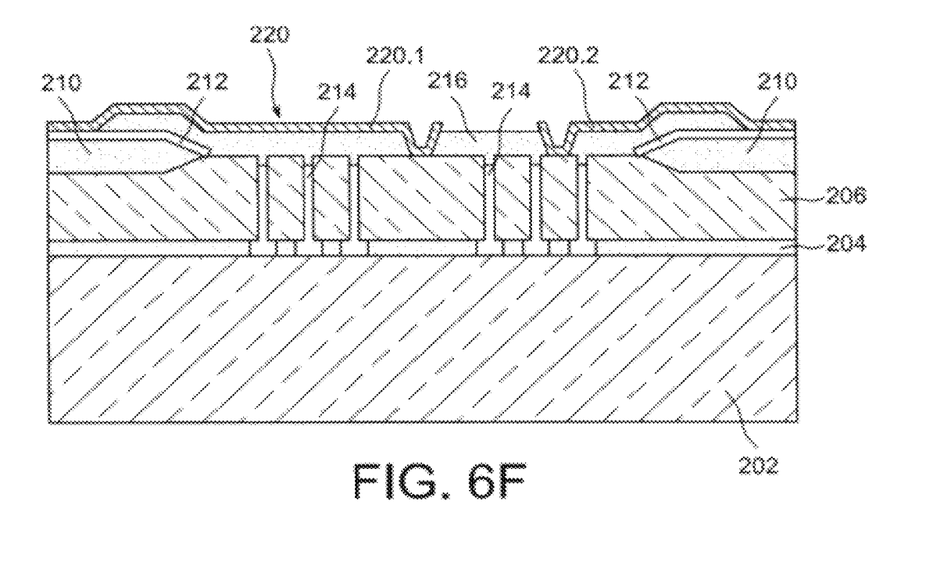
Figure 6G:
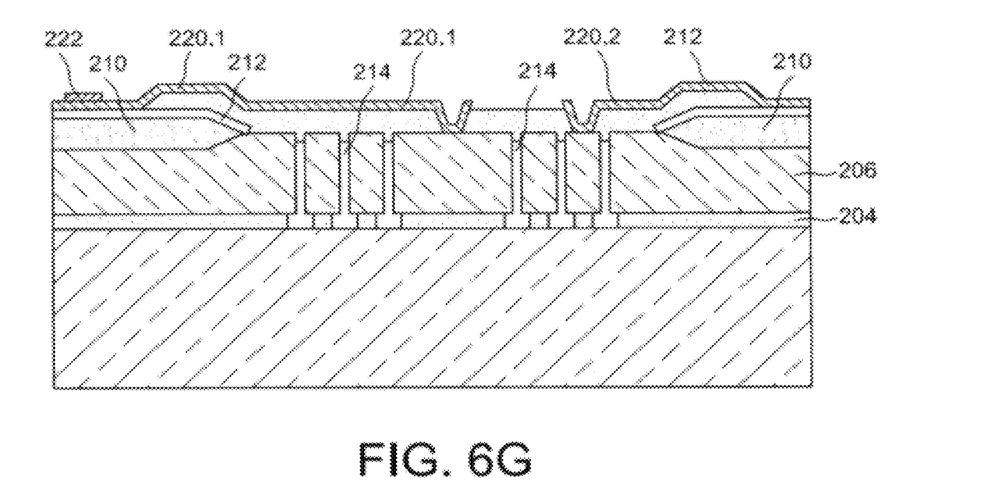
Figure 6H:
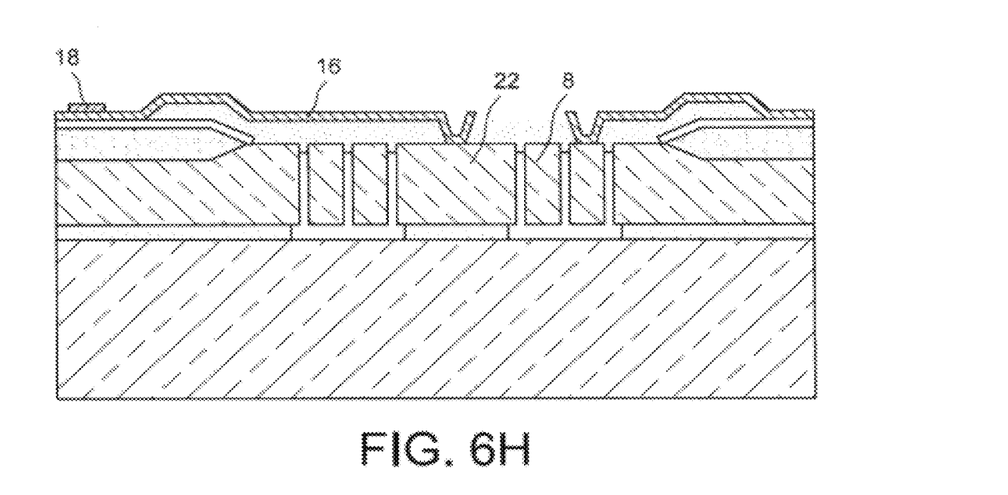

The element obtained can be seen in FIG. 6F, on which the part 220.1 of the polysilicon layer 220 that will form the electrode and the part 220.2 of the polysilicon layer 220 that will form an electrical conductor track connecting the mobile part to the contact pad can be seen.

The contact pads 18 are made in the next step. This is done by depositing a metallic layer on the polysilicon layer, for example made of AlSi. A resin layer is then deposited on this metallic layer and lithography of the resin is done to etch this metallic layer. Finally, the resin is removed by stripping. The element obtained can be seen in FIG. 6G.

The inertial mass, the suspended electrode 16 and the electrical conductor tracks are released in a final step. This is done by wet etching the PSG layer 216, and etching the buried $SiO_2$ oxide 204, for example using hydrofluoric acid vapour. This acid etching may for example be a time etching. The element obtained can be seen in FIG. 6H, in which the electrode 16 suspended using a pillar 22 and the detection part 8 can be seen, together with the electrical conductor track connecting the detection part to a contact pad (not visible).

In the method described above, the dimension of the sides of the pillars is more than twice the release distance, corresponding to the width of etching along a direction contained in the plane.

With this invention, the gyrometer with detection of rotation about an axis in the plane has reduced parasitic capacitances and can be made more easily than gyrometers according to the state of the art.

The invention claimed is:

1. Gyrometer comprising:
   a substrate;
   an inertial mass suspended above the substrate, the inertial mass formed from a planar layer of material comprising at least one excitation part and at least one detection part, wherein the excitation part is movable relative to the substrate in at least one direction contained in a plane of said inertial mass; and
   a capacity detector configured to detect movement of said detection part outside the plane of said inertial mass, said capacitive detector consisting of a detection electrode suspended above the detection part such that an entire detection electrode is above a plane under which an entire inertial mass is located and the detection part is interposed between the detection electrode and the substrate so as to form a variable capacitor with said detection part, said detection electrode being held above said detection part by at least one pillar anchored to said detection electrode at a first end of the pillar, passing through the inertial mass, and anchored to the substrate.

2. Gyrometer according to claim 1, wherein a orthogonal projection along an axis perpendicular to the plane of said inertial mass of each point on the detection electrode is located on the detection part.

3. Gyrometer according to claim 2, wherein the detection electrode has a surface area approximately equal to a surface area of the detection part.

4. Gyrometer according to claim 2, wherein said at least one pillar passes through only the inertial mass anchored to the substrate.

5. Gyrometer according to claim 1, further comprising one or more passages, through which the pillar(s) pass through the detection part and/or the excitation part in zones adjacent to edges of the detection part.

6. Gyrometer according to claim 5, wherein clearance between parallel edges of the pillars and the passages in the excitation direction is equal to 0.5 µm to 1 µm more than an excitation maximum amplitude.

7. Gyrometer according to claim 6, wherein sides of the pillars are between 10 µm and 100 µm and the clearance between the parallel edges of the pillars and the passages is between 1 µm and 10 µm.

8. Gyrometer according to claim 5, wherein sides of the pillars are between 10 µm and 100 µm and clearance between parallel edges of the pillars and the passages is between 1 µm and 10 µm.

9. Gyrometer according to claim 1, further comprising a cover that delimits a hermetically sealed cavity around the at least one inertial mass and the at least one detection electrode, a vacuum being set up in said cavity.

10. Measurement system comprising at least a gyrometer according to claim 1 and also at least one accelerometer and/or a gyrometer to detect rotations about an axis outside the plane.

11. Measurement system according to claim 10, wherein the gyrometer to detect rotations about an axis outside the plane comprises detection electrodes perpendicular to the plane of the gyrometer to detect rotations about an axis outside the plane to detect displacement in the plane of said at least one detection part of the gyrometer that detects rotations about an axis outside the plane.

12. Measurement system according to claim 10, wherein the accelerometer is a capacitive accelerometer that detects out-of-plane accelerations and comprising at least one electrode for detecting an out-of-plane acceleration, contained in the plane and/or a capacitive accelerometer that detects in-plane accelerations and comprising at least one electrode perpendicular to the plane.

13. Gyrometer of claim 1, wherein said detection electrode comprises a single detection electrode suspended above the detection part.

14. Gyrometer of claim 1, wherein said detection electrode comprises a plurality of detection electrodes suspended above the detection part.

15. Gyrometer comprising:
a substrate;
an inertial mass suspended above the substrate, the inertial mass formed from a planar layer of material comprising at least one excitation part and at least one detection part, wherein the excitation part is movable relative to the substrate in at least one direction contained in a plane of said inertial mass; and
a capacity detector configured to detect movement of said detection part outside the plane of said inertial mass, said capacitive detector comprising at least one detection electrode suspended above the detection part such that an entire detection electrode is above a plane under which an entire inertial mass is located and the detection part is interposed between the at least one electrode and the substrate so as to form a variable capacitor with said detection part, said electrode being held above said detection part by at least one pillar comprising a first anchor part anchored to said electrode and connected to a pillar body formed from said planar layer of material and passing through the inertial mass, and a second anchor part connected to the pillar body and anchored to the substrate, wherein the inertial mass comprises a disk-shaped excitation part, said excitation part being free to move about the axis of said disk, and several detection parts arranged to be free to move inside the excitation part.

16. Process for making a gyrometer according to claim 1, comprising the following steps starting from an element including an oxide layer deposited on a substrate and covered with an active layer:
deposition of a first protective layer protecting the active layer against oxidation,
etching of the protective layer to release the active layer in at least a first zone,
thermal oxidation and growth of an oxide at the first zone in the released active layer, so as to form an oxide overthickness at said first zone,
deposition of a second protective layer on the oxide overthickness,
etching of the active layer to form trenches that reach the oxide layer,
deposition of a closing off layer covering the active layer and closing off the trenches,
etching of said closing off layer to release at least one second zone of the active layer,
formation of the detection electrode such that the electrode is supported on said second zone,
release of the inertial mass and the electrode.

17. Fabrication method according to claim 16, in which the first and/or the second protective layer(s) is (are) made of Si3N4.

18. Fabrication method according to claim 16, in which the closing off layer covering the active layer and closing the trenches is made of phosphorus silicate glass.

19. Fabrication method according to claim 16, comprising a step to make at least one contact pad, after the detection electrode has been made and at least one non-suspended electrical conductor track connected to the detection electrode, the contact pad being made on the conduct track.

20. Fabrication method according to claim 19, in which the electrical conductor track is made at the same time as the detection electrode.

21. Fabrication process according to claim 16, in which the element is a silicon on insulator substrate and the detection electrode is made of polysilicon.

22. Method according to claim 16, in which the release step is obtained by wet etching of the phosphorus silicate glass and etching of the oxide layer.

23. Process for making a system according to claim 10, comprising the following steps starting from an element including an oxide layer deposited on a substrate and covered with an active layer:
  deposition of a first protective layer protecting the active layer against oxidation,
  etching of the protective layer to release the active layer in at least a first zone,
  thermal oxidation and growth of an oxide at the first zone in the released active layer, so as to form an oxide overthickness at said first zone,
  deposition of a second protective layer on the oxide overthickness,
  etching of the active layer to form trenches that reach the oxide layer,
  deposition of a closing off layer covering the active layer and closing off the trenches,
  etching of said closing off layer to release at least one second zone of the active layer,
  formation of the detection electrode such that the electrode is supported on said second zone,
  release of the inertial mass and the electrode.

24. Fabrication method according to claim 23, in which the first and/or the second protective layer(s) made of Si3N4.

25. Fabrication method according to claim 23, in which the closing off layer covering the active layer and closing the trenches is made of phosphorus silicate glass.

26. Fabrication method according to claim 23, comprising a step to make at least one contact pad, after the detection electrode has been made and at least one non-suspended electrical conductor track connected to the detection electrode, the contact pad being made on the conductor track.

27. Fabrication method according to claim 26, in which the electrical conductor track is made at the same time as the detection electrode.

28. Fabrication process according to claim 23, in which the element is a silicon on insulator substrate and the detection electrode is made of polysilicon.

29. Method according to claim 25, in which the release step is obtained by wet etching of the phosphorus silicate glass and etching of the oxide layer.

* * * * *